April 22, 1969 H. J. BOLL 3,440,352
PIEZORESISTANCE ELEMENT MICROPHONE CIRCUIT
Filed Sept. 9, 1966
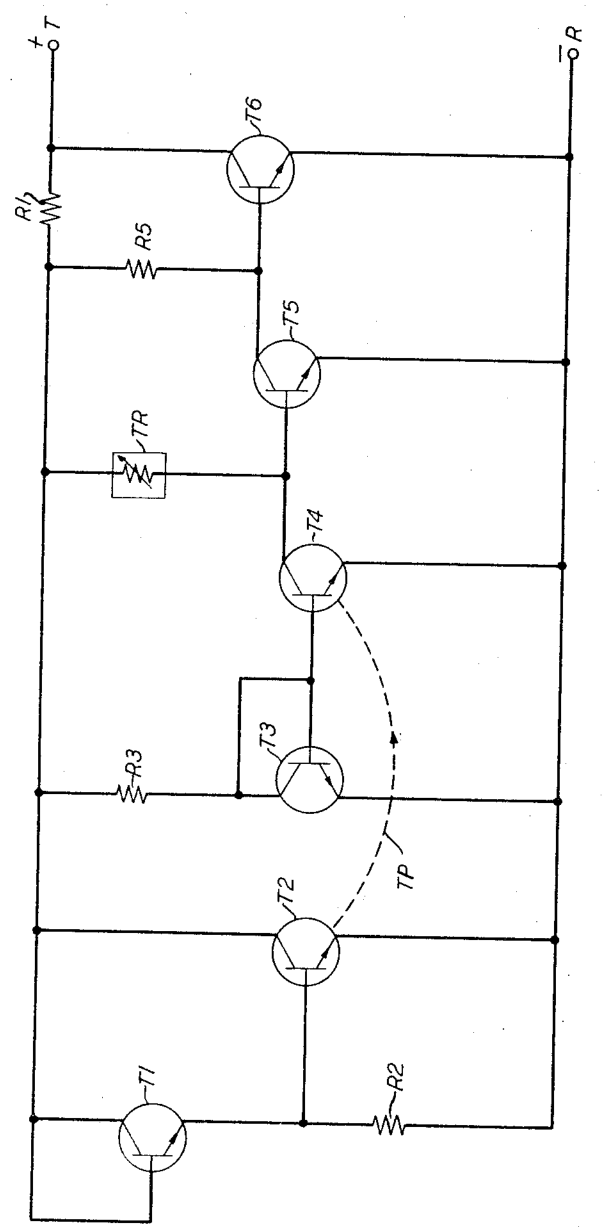
INVENTOR
H. J. BOLL
BY [signature]
ATTORNEY United States Patent Office 3,440,352
Patented Apr. 22, 1969

3,440,352
PIEZORESISTANCE ELEMENT MICROPHONE CIRCUIT

Harry J. Boll, Berkeley Heights, N.J., assignor to Bell Telephone Laboratories, Incorporated, Murray Hill, N.J., a corporation of New York Filed Sept. 9, 1966, Ser. No. 578,268
Int. Cl. H04m *1/00*
U.S. Cl. 179—1 10 Claims

ABSTRACT OF THE DISCLOSURE

A telephone amplifier for use with a piezoelectric microphone is rendered insensitive to line voltage variations by a feedback path that operates thermally by depositing separate stages of the amplifier on one substrate.

This invention relates to amplifying circuits and more particularly to amplifying circuits employed with electroacoustic or electromechanical transducers.

In conventional telephone transmitters, voice modulation of centrally supplied D.C. current is achieved by varying the resistance of a small capsule of carbon granules in accordance with applied acoustic pressure. The resulting variations in the current waveform thus correspond to the variations of the acoustical waveform. Microphones of this type, although generally reliable, are subject to irregularities in their transmission characteristics owing to uneven packing of the carbon granules. Uneven packing typically occurs in the transmitters of wall telephones or similar station arrangements that involve vertical positioning of the handset and its transmitter over long periods of time.

It has long been known that the primary advantages of a carbon granule transmitter, rugged simplicity and low cost, can also be realized by the utilization of transducers in the form of solid state p-n junction devices or piezoresistive elements, that exhibit variations in the resistance between two points on opposite sides of the junction in response to variations in applied acoustic or mechanical pressure. One illustrative device of this type is shown by H. C. Montgomery in U.S. Patent 2,632,062 issued Mar. 17, 1953. Moreover, a piezorestistive microphone or transducer, being formed of a solid material such as silicon or the like, has an additional advantage in that it eliminates the packing problem of carbon granule type microphones. One disadvantage of a piezoresistive type transmitter, which heretofore has deterred commercial development, is that of low efficiency. The resistance changes exhibited by a piezoresistive device in response to the application of an acoustic wave from the human voice are very small when compared to the resistive changes that take place in a capsule of carbon granules under similar conditions. Accordingly, amplification is required.

It would appear that the ready availability of low cost transistor amplifiers, particularly those fabricated by integrated circuit techniques, would automatically overcome any objection to piezoresistive microphones based on the need for amplification. The problem, however, is not that simple. Transistor amplifier circuitry heretofore proposed for such use generally requires reactive circuit elements, either capacitors or inductors or both, and, as a result, the savings in both cost and size that typify solid state integrated circuitry can not be fully realized.

Another aspect of the problem, particularly pertinent to the telephone art, lies in the fact that in a telephone transmitter amplifier, the audio output is in effect being transmitted to the D.C. power supply source, i.e. the central office. In contrast, in most other transducer amplifier arrangements there is an internal power supply together with a pair of input terminals and a separate pair of output terminals. Consequently, in a telephone transmitter amplifier employing transistors that require a substantially steady source of D.C. bias, some means must be provided to separate or decouple the steady state D.C. supply from the audio frequency A.C. component that is superimposed upon it.

Decoupling may of course readily be achieved by the use of filters employing large capacitors. This solution is unacceptable, however, from the standpoint of both cost and component size. The advantages inherent in the use of integrated circuit techniques for the remainder of the circuitry are clearly overshadowed by the disadvantages of employing large capacitors.

Accordingly, an object of the invention is to eliminate the need for reactive circuit components in amplifier circuits for variable resistance type transducers.

Another object is to effectively decouple a steady state D.C. component from a superimposed audio signal, without employing capacitors, in a transducer amplifier circuit in which the D.C. supply is applied across the output of the transmission line.

These objects are achieved in an illustrative embodiment of the invention that employs a variable resistance type transmitter in circuit combination with an amplifier that requires no reactive components. Acoustic-electric translation is effected by a piezoresistive element connected in the base circuit of the first stage of a two-stage direct coupled transistor amplifier. Substantially complete decoupling of the steady state D.C. biasing current from the modulated current is achieved by the use of a unique pair of diode-transistor decoupling stages.

In accordance with an important feature of the invention a thermal delay path is employed between the two decoupling transistors. The thermal delay path ensures constant line voltage, accommodates a wide range of D.C. line current and compensates for unavoidable manufacturing variations in individual circuit components. Sufficient time delay is provided by the thermal path to prevent signal feedback at audio frequencies.

The principles of the invention as well as additional objects and features thereof will be fully apprehended from the following detailed description of an illustrative embodiment and from the appended drawing in which the single figure is a schematic diagram of a circuit in accordance with the invention.

The circuit shown in the drawing is suitable for use as a part of the speech network in a subscriber's telephone set, and the following description of the circuit is made in the context of that environment. The invention is in no way restricted to such employment, however, and its principles are equally applicable to any transducer amplifier involving similar requirements.

The amplifier portion of the circuit is comprised of a pair of D.C. coupled n-p-n transistors, T5 and T6. The output transistor T6 has its collector connected directly to the output terminal T and its emitter connected directly to the output terminal R. Input signals are applied to the base of the input transistor T5 by way of current variations which correspond to the resistance variations in the transmitter TR which in turn are effected by the application of varying acoustic energy. The transmitter TR may be any one of a variety of acoustic or mechanical pressure responsive devices whose resistance varies in accordance with applied energy, such as the device disclosed in the Montgomery patent cited above, for example.

In a D.C. coupled amplifier of the type shown, which may have a gain of 1000, for example, it is essential that the D.C. operating point be established within a relatively narrow margin such as one-half volt. To meet such a requirement the biasing voltage on the base of transistor T5 would have to be maintained within plus or minus one-half millivolt. It is therefore evident that additional circuit means must be employed to stabilize the D.C. operating point of the amplifier. Stated otherwise, the problem is to maintain the biasing voltage on the base of transistor T5 at a constant value independent of what the instantaneous line voltage happens to be. Stabilization is achieved in accordance with the invention, and in a manner described in detail hereinbelow, by means of thermal coupling between transistors T2 and T4.

As indicated above, a two-stage decoupling circuit effectively prevents the audio frequency variations appearing in the amplifier output from interfering with the output of the transmitter. The first stage of decoupling is comprised of resistor R1, transistor T1, resistor R2 and transistor T2. Transistor T1 has a shorting path between its collector and base electrodes and accordingly functions as a diode connected between the base of transistor T2 and the tie point of resistor R1. Transistor T1 is utilized in the manner shown in lieu of a diode so that all of the solid state elements employed in the circuit may be identical, which greatly simplifies fabrication of the circuit by integrated circuit techniques. In operation, current flows through transistor T1 as a result of current flow through resistor R2 and the base current of transistor T2. The A.C. impedance of transistor T1 is very low compared to the input impedance presented by the base of transistor T2. Thus, in effect, except for the D.C. drop across transistor T1, the base of transistor T2 is connected to the tie point of resistor R1 insofar as A.C. is concerned. Transistor T1 performs as a rectifying junction.

The A.C. impedance at transistor T2 that is presented to the tie point of resistor R1 is also very low in comparison with the resistance of resistor R1 and the A.C. voltage at the collector of transistor T2 is thus substantially reduced compared to the A.C. voltage on the line. As a result, the D.C. collector voltage of transistor T2 is maintained at a level of approximately 1.4 volts which corresponds to the voltage drop across two forward biased p-n junctions. These junctions are the emitter-base diode of transistor T2 and the emitter-base diode of transistor T1.

As indicated above, a single stage of decoupling is insufficient to maintain the base voltage of transistor T5 to the required tolerance. In accordance with the invention a second stage of decoupling is provided by transistors T3 and T4. Transistors T3 and T4 are connected in what amounts to a differential pair with the inputs tied together. Any small A.C. voltage that remains at the collector of transistor T2 results in a corresponding but smaller A.C. voltage at the base of transistor T3, owing to the voltage drop across resistor R3. Transistor T3 operates as a diode connected between the base of transistor T4 and the terminal R as a result of the short circuit path connecting its collector to its base. This configuration results in the same circuit advantage as that pointed out above in connection with the discussion of transistor T1.

If transistors T3 and T4 were exactly matched and the resistance of resistors R3 were exactly equal to the resistance presented by the transmitter TR, then the small A.C. voltage appearing on the base of transistor T4 would be precisely that required to maintain the voltage on the collector of transistor T4 constant independent of the voltage at the collector of transistor T2. In accordance with the invention, however, the D.C. resistance of resistor R3 is approximately fifty percent higher than the resistance presented by the transmitter TR. Consequently, transistor T5 is normally fully conducting and transistor T6 is essentially cut off.

With transistor T6 cut off, any significant rise in line voltage causes a relatively high flow of current through resistor R1. This high current, which also flows through transistor T2, dissipates substantial power which is converted into heat and the temperature of transistor T2 rises. In accordance with the invention, transistors T2 and T4 are in close physical proximity and may for example be deposited on the same glass substrate. Heat from transistor T2 is transmitted to transistor T4 by the thermal path TP. Before transistor T4 attains the temperature of transistor T2, however, there is a brief delay, introduced by the thermal path TP, which delay may be on the order of one tenth of a second. As the temperature of transistor T4 increases it starts to conduct more heavily and as transistor T4 conducts more heavily, the base voltage of transistor T5 becomes more negative. Accordingly, the collector of transistor T5 becomes more positive causing transistor T6 to conduct, thus bringing the line voltage down and providing the desired operating point stabilization.

When the resistance of transmitter TR is varied by the application of acoustic power, these fluctuations are passed directly through the amplifying transistors T5 and T6 to the line.

The two decoupling stages described above perform in effect as a high pass filter inasmuch as the time delay introduced by the thermal path TP is very long compared to a cycle of audio frequency. As a result, the negative feedback path from the collector of transistor T6 through resistor R1, transistor T2 and thence through the thermal loop TP to transistor T4 is ineffective insofar as audio frequency signals are concerned.

It is to be understood that the embodiment described herein is merely illustrative of the principles of the invention. Various modifications thereto may be effected by persons skilled in the art without departing from the spirit and scope of the invention. For example, line current, rather than line voltage may be stabilized. This change may readily be accomplished by inserting a resistance into the collector circuit of transistor T6 and providing a thermal delay path between this resistance and transistor T4. This thermal delay path would be employed in lieu of the thermal path shown between transistors T2 and T4. The basic operating principles of the circuit would, however, remain unchanged.

What is claimed is:

1. A telephone transmitter circuit connectable to the terminals of a telephone line comprising, in combination, a transistor amplifier circuit having an input point, means including an acoustically variable resistance element for applying an acoustically variable current to said point, first and second decoupling circuits for stabilizing the D.C. operating point of said amplifier circuit, a thermal delay path connecting said decoupling circuits, said path providing negative feedback for said amplifier circuit thereby to stabilize the supply voltage on said line, the time constant of said path being sufficiently long to preclude negative feedback at audio frequencies, and means connecting the output of said second decoupling circuit to said input point.

2. Apparatus in accordance with claim 1 wherein each of said decoupling circuits includes at least one transistor, each having a short circuit path connecting its collector and base electrodes thereby enabling said transistors to function as diodes.

3. Apparatus in accordance with claim 1 wherein said amplifier circuit comprises first and second transistors in common emitter configuration, one terminal of said variable resistance element being connected to the base of said first transistor of said amplifier, a first resistor having one terminal connected to one of the terminals of said line, and a second resistor connecting the free terminal of said first resistor and said element to the collector of said first transistor of said amplifier and to the base of said second transistor of said amplifier.

4. Apparatus in accordance with claim 3 including means directly connecting the emitter of each of said transistors to the other terminal of said line.

5. A telephone transmitter circuit having first and second terminals connectable to the terminals of a telephone line comprising, in combination, an amplifier circuit having an input point and an output point coinciding with said first terminal, a decoupling circuit including a negative feedback path connecting said output point to said input point for stabilizing the supply voltage on said line, said feeback path including a first resistive element having one terminal thereof connected to said output point, and an electroacoustic transducer having a resistance that varies in correspondence with the variations of an applied acoustic wave connected between the free terminal of said resistive element and said input point, said feedback path further including a thermal delay path with a time delay of sufficient duration to preclude negative feedback at audio frequencies.

6. Apparatus in accordance with claim 5 wherein said transducer comprises a piezoresistive element.

7. Apparatus in accordance with claim 5 wherein said feedback path further includes a first diode and a second resistive element connected in series relation between said free terminal of said first resistive element and said second terminal, a first transistor having a base electrode connected to the junction point of said first diode and said second resistive element, a collector electrode connected to said free terminal and an emitter electrode connected to said second terminal, a second diode and a third resistive element connected in series relation between said emitter and collector electrodes respectively of said first transistor, a second transistor having a base electrode connected to the junction point of said second diode and said third resistive element, a collector electrode connected to said input point and an emitter electrode connected to said second terminal, said thermal delay path connecting said first and second transistors.

8. Apparatus in accordance with claim 5 wherein said amplifier comprises a third transistor having a base electrode connected to said input point, a fourth transistor having a base electrode connected to the collector electrode of said third transistor, and a collector electrode connected to said output point, and a fourth resistive element connected between said free terminal and said base electrode of said fourth transistor, and means connecting the emitter electrodes of said third and fourth transistors to said second terminal.

9. Apparatus in accordance with claim 7 wherein said first diode comprises a transistor with a shorting path between the base and collector electrodes thereof.

10. Apparatus in accordance with claim 9 wherein said second diode comprises a transistor with a shorting path between the base and collector electrodes thereof.

References Cited

UNITED STATES PATENTS

| | | | |
|---|---|---|---|
| 2,692,337 | 10/1954 | Hanson | 331—108 |
| 3,023,368 | 2/1962 | Erath | 330—14 |
| 3,073,969 | 1/1963 | Skillen | 330—40 |
| 3,185,932 | 5/1965 | Walker et al. | 330—12 |
| 3,265,981 | 8/1966 | Dill | 330—110 |
| 3,258,606 | 6/1966 | Meadows | 307—303 |
| 3,393,328 | 7/1968 | Meadows | 307—303 |

KATHLEEN H. CLAFFY, *Primary Examiner.*

ROBERT P. TAYLOR, *Assistant Examiner.*

U.S. Cl. X.R.

307—303; 330—25